United States Patent [19]

Cullender

[11] 4,209,673
[45] Jun. 24, 1980

[54] AUTOMATIC DISINFECTANT APPARATUS FOR TELEPHONE HANDSET

[76] Inventor: Eric Cullender, Karl-Arnold-Str. 4, 4740 Oelde, Fed. Rep. of Germany

[21] Appl. No.: 953,162

[22] Filed: Oct. 20, 1978

[30] Foreign Application Priority Data

Oct. 29, 1977 [DE] Fed. Rep. of Germany ....... 2748679

[51] Int. Cl.² .............................................. H04R 1/12
[52] U.S. Cl. .................................................... 179/185
[58] Field of Search ..................... 179/185, 178, 179

[56] References Cited

U.S. PATENT DOCUMENTS 3,643,040  2/1972  Kaneyasu ............................ 179/185

FOREIGN PATENT DOCUMENTS

| 53927 | 6/1912 | Austria | 179/185 |
| 1961406 | 6/1971 | Fed. Rep. of Germany | 179/185 |
| 573863 | 7/1924 | France | 179/185 |
| 651705 | 4/1951 | United Kingdom | 179/185 |
| 711993 | 7/1954 | United Kingdom | 179/185 |

*Primary Examiner*—Thomas W. Brown
*Attorney, Agent, or Firm*—Karl F. Ross

[57] ABSTRACT

A device such as a telephone handset is provided with a reservoir holding a quantity of a disinfectant. This reservoir is connected via a conduit to nozzles at the mouthpiece of the handset. A valve or the like on the reservoir is operated when the handset is set down or lifted off the base part of the telephone so as automatically to spray a small quantity of the disinfectant at the mouthpiece and earpiece to cleanse same.

11 Claims, 4 Drawing Figures

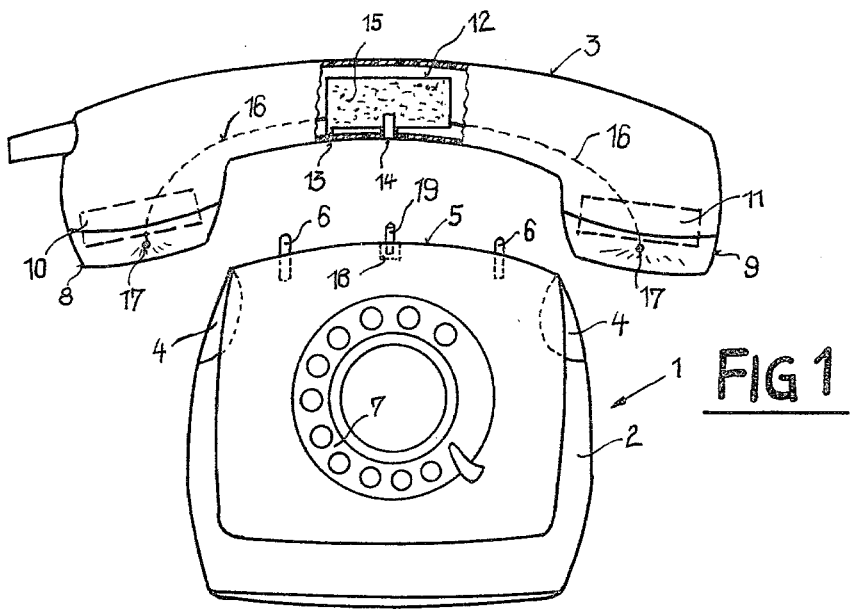
FIG 1
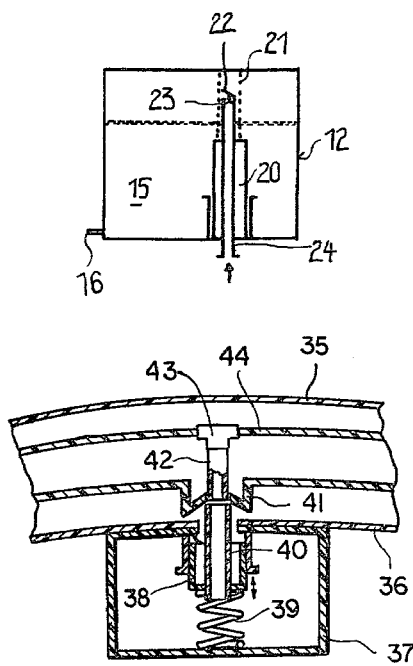
FIG 2
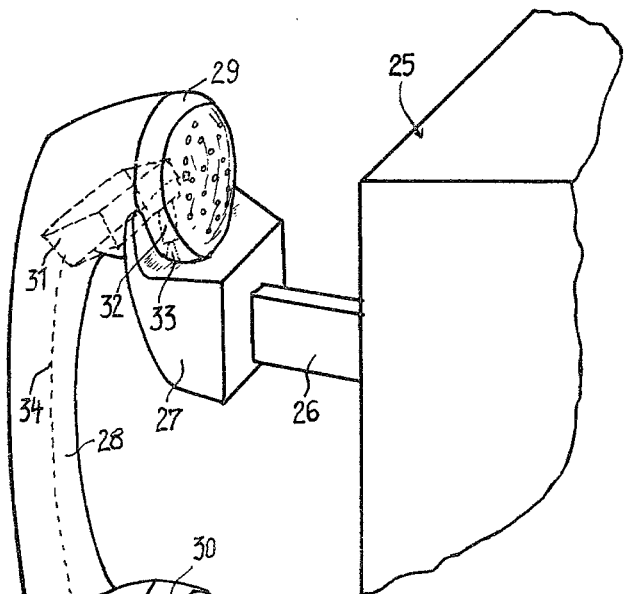
FIG 3
FIG. 4

AUTOMATIC DISINFECTANT APPARATUS FOR TELEPHONE HANDSET

FIELD OF INVENTION

The present invention relates to an apparatus for automatically disinfecting a device such as a telephone handset, microphone, pair of headphones, or the like. More particularly this invention concerns such an apparatus which automatically disinfects such a device each time it is used.

BACKGROUND OF THE INVENTION

A telephone handset, particularly of a public telephone, is a well-known transmitter of disease. A statistical study was made in England indicated that up to 16% of the diseases resulting in absence from work were caught or could have been caught from a telephone. In fact it is widely accepted that such devices are relatively unhealthy, often harboring entire colonies of various types of bacteria capable of infecting the user with a communicable disease.

Sprays are known, normally for office use, which are employed to disinfect a telephone mouthpiece and earpiece. Such a spray is normally simply alcohol that is misted over the part to be disinfected to kill bacteria thereon. Such as expedient is, however, relatively impractical for a public-telephone user.

OBJECTS OF THE INVENTION

It is therefore an object of the present invention to provide an apparatus for disinfecting a device such as a telephone handset, microphone, pair of earphones, or the like.

Another object is to provide such an apparatus which functions automatically.

Another object is to provide such an apparatus which can be built at relatively low cost directly into the device being protected.

SUMMARY OF THE INVENTION

These objects are attained according to the instant invention in an apparatus having a reservoir containing a body of liquid disinfectant, a conduit extending between this reservoir and the housing containing an electronic sound transducer, and means including interengaging parts on the housing and on its support for feeding a predetermined quantity of this disinfectant through the conduit from the reservoir to a location adjacent the transducer on displacement of the housing between a position resting on the support and a position spaced from the support.

In the system according to the instant invention the transducer area being protected is automatically disinfected each time the device having the transducer is picked up for use, or each time it is set down after use. The invention is equally applicable to a microphone such as for a dictating machine, to a set of earphones, or to any other such device normally brought into close juxtaposition with the mouth or ear of the user. The device is particularly applicable for use with a telephone handset, however, in which case the conduit extends to a spray nozzle or the like at both the mouthpiece and earpiece of such a handset.

It is possible in accordance with the instant invention to provide the reservoir either directly in the device that is being protected, or in the support for this device. In case of a telephone, therefore, the reservoir may be provided directly in the base part of the telephone, with the conduit extending to the handset. When provided in the handset a pin or the like is provided on the base which operates a valve or the like in the handset to dose the disinfectant. This pin may be coupled to a spring and to a toggle-type mechanism operated by the cradle carrying the handset so as automatically to spring out with considerable force once the handset is cradled to release a dose of the disinfectant.

It is also possible to provide the arrangement with a piston that is depressed each time the handset is set down so as to pressurize the reservoir. The slight superatmospheric pressure thus created in the reservoir can force the disinfectant out through capillary tubes, and a check valve can be provided to readmit air to the reservoir when the handset is again lifted. Otherwise the entire reservoir may simply be pressurized and a valve provided which opens briefly each time it is actuated.

The reservoir may be removable and disposable, so that a new supply of disinfectant is provided simply by fitting a new reservoir into the housing. Alternatively the reservoir may have an externally accessible fill opening that is fittable to a nipple on a filling container in a manner of a gas cigarette lighter or the like.

According to further features of this invention a public telephone, which normally has a fork that holds the earpiece of the handset, is provided with such a device directly in the handset behind the earpiece. The fork is provided with an upwardly extending pin that operates a valve for the cartridge-type reservoir. During the normal periodic servicing of the public telephone the earpiece is unscrewed and the reservoir-cartridge is replaced. Such a device ensures that the public telephone is less of a disease spreader than has hitherto been the case.

According to another feature of this invention the disinfectant is a solution of hexachlorobenzine, a phenyl derivative, or another chemical bactericide in an organic solvent. Mixed into this solution may be a perfume or the like to prevent the device being protected from taking on an unpleasant antiseptic smell.

BRIEF DESCRIPTION OF THE DRAWING

FIG. 1 is a front view partly in section of a telephone equipped with a device according to the instant invention;

FIG. 2 is a reservoir according to the instant invention;

FIG. 3 is a perspective view of another telephone equipped with a sanitizing device of this invention; and FIG. 4 is a large-scale sectional view through another arrangement in accordance with this invention.

SPECIFIC DESCRIPTION

As shown in FIG. 1 a desk-type telephone 1 has a base 2 and a handset 3. The handset 3 has ends receivable in recesses 4 of the base 2, with its intermediate portion resting on an upper surface 5 and engaging switch-type forks 6 of the base 2 which also has a dial 7. The handset 3 has a mouthpiece 8 and an earpiece 9 respectively housing a microphone 10 and a loudspeaker 11, and is connected to the base 2 by means of a cord.

According to this invention a reservoir 12 having a filling hole 13 is provided in the handset intermediate the mouthpiece 8 and earpiece 9 and provided with the valve 14 actuatable to release a dose of a disinfectant 15 held in the reservoir 12 via conduits 16 to spray nozzles 17 located at the mouthpiece 8 and the earpiece 9. The base part 2 is provided with a seat 18 holding a pin 19 that briefly opens the valve 14 each time the handset 3 is set down on the support surface 5 of the base 2. To this end linking mechanism may be provided which is connected to the depressible forks 6 and which causes the pin 19 to spring out with considerable force briefly each time the handset 3 is set down to momentarily actuate the valve 14 and create a good spray at the nozzles 17. A cloth may be provided at the mouthpiece 8 and earpiece 9 to absorb and spread the spray.

It is possible to form the reservoir as shown in FIG. 2 with a piston 20 normally biased into the indicated position via a spring 21 and connected to a tube 24 forming a projecting pin engageable with the pin 19. This tube 24 has an open upper end 23 provided with a one-way check valve 22. When the headset 3 is set down the reservoir 12 is pressurized by advance of the piston 20 into itself, thereby forcing a quantity of the liquid 15 out of the conduits 16. When the handset 3 is lifted, however, the spring 21 returns the piston 23 to the illustrated position and the valve 22 opens briefly against the force of its spring to allow air back into the reservoir 12' to return it to atmospheric pressure.

FIG. 3 shows a public telephone having a base 25 provided with an arm 26 having a fork 27 engageable around the earpiece 29 of a handset 28 also having a mouthpiece 30. A reservoir 31 located immediately behind the earpiece 29 has a valve 22 operated by a pin 33 in the fork 27. Thus when the handset 28 is set down a dose of liquid will be fed via conduits 34 from the reservoir 31 to the mouthpiece 30 and earpiece 29. This reservoir 31 is not refillable like the reservoir 12 of FIG. 1, but instead is of the cartridge type that is replaced periodically when the telephone is serviced, by unscrewing of the earpiece and removal of the reservoir 31.

FIG. 4 shows another arrangement where the intermediate part 35 of a handset is restable on a support 36 provided with a reservoir 37. A piston 38 is displaceable in this reservoir against the force of a spring 39 and has a central tube 40 with an upwardly open upper end engageable in a seat 41 formed on the handset part 35. A conduit 42 communicates via a tee 43 to two further conduits 44 respectively leading to the not-illustrated mouthpiece and earpiece.

Thus in the arrangement of FIG. 4 as the handset is placed on the support 36 the piston 38 will be depressed to pressurize the reservoir 37 as described above with reference to FIG. 2, thus here causing fluid to flow through the tube 40 then through the tube 42 and through the tube 44 to the mouthpiece and earpiece. When the handset is lifted off the support 36 the open end of the tube 40 will allow the reservoir 37 to return to atmospheric pressure for pumping out of another dose the next time the handset is set down.

I claim:
1. In combination:
   a support;
   an electronic sound transducer;
   a housing containing said transducer at a predetermined location and liftable by the hand from a position resting on said support to a position juxtaposed with the ear or mouth of the user;
   a reservoir removably mounted in said housing and containing a body of liquid disinfectant;
   a conduit extending in said housing between said reservoir and said location; and
   means including interengaging parts on said housing and on said support and a valve in said conduit in said housing for momentarily opening said valve and thereby feeding a predetermined quantity of said disinfectant through said conduit from said reservoir to said location on displacement of said housing from one of said positions into the other position.

2. The combination defined in claim 1 wherein said housing is a telephone handset.

3. The combination defined in claim 1 wherein said disinfectant is under superatmospheric pressure in said reservoir.

4. The combination defined in claim 1 wherein said means includes a piston reciprocal in said reservoir to pressurize same and connected to one of said parts.

5. The combination defined in claim 4 wherein said reservoir is provided with a check valve permitting air flow into said reservoir.

6. The combination defined in claim 1 wherein one of said parts is a pin projecting upwardly from said support, said valve in said housing being operable by said pin.

7. The combination defined in claim 6 wherein said support includes a handset-holding fork provided with said pin.

8. The combination defined in claim 6 wherein said handset has a pair of such transducers, one being a microphone and the other a loudspeaker, said conduit leading to both of said transducers.

9. The combination defined in claim 7 wherein said support includes a handset-holding fork provided with said pin and engageable around said housing at said loudspeaker.

10. The combination defined in claim 1 wherein said disinfectant includes a perfume.

11. The combination defined in claim 1 wherein said reservoir is provided with an externally accessible fill opening.

* * * * *